United States Patent Office 3,835,031
Patented Sept. 10, 1974

3,835,031
CATALYTIC CRACKING WITH REDUCED
EMISSION OF SULFUR OXIDES
Ralph J. Bertolacini, Chesterton, and Gerald M. Lehmann, Highland, Ind., and Eugene G. Wollaston, Chicago, Ill., assignors to Standard Oil Company, Chicago, Ill.
No Drawing. Filed May 23, 1973, Ser. No. 363,082
Int. Cl. B01j 11/68; C01b 17/56
U.S. Cl. 208—120        10 Claims

ABSTRACT OF THE DISCLOSURE

A cyclic fluidized catalytic cracking process is operated with a catalyst comprising molecular sieve in a silica-alumina matrix, impregnated with one or more Group IIA metal oxides to provide from about 0.25 to about 5.0 wt. percent of Group IIA metal or metals. The emission of sulfur oxides in the regenerator stack gases is decreased by at least about 50%.

BACKGROUND OF THE INVENTION

Much attention is being devoted to reducing the level of emissions of various combustion products and particulates from regenerator effluent streams associated with petroleum cracking units. Pollution control standards have been developed for emission of carbon monoxide and for particulate matter and are expected to be considered soon for other emissions, such as the sulfur oxides, particularly sulfur dioxide.

When high-sulfur feed stocks, i.e., petroleum hydrocarbon fractions containing organic sulfur compounds, are charged to a catalytic cracking unit, sulfur is deposited in the coke on the catalyst. During regeneration of the coked, de-activated catalyst, the coke is burned from the catalyst surfaces and, in this combustion process, the sulfur present is converted to sulfur dioxide, together with a minor proportion of sulfur trioxide, and thus included in the regenerator flue gas effluent stream. Emissions of sulfur oxides, when processing a high-sulfur feedstock, are often in the range of about 1200 p.p.m. A present objective is the reduction of such sulfur oxide ($SO_x$) emissions to a level no greater than about 500 p.p.m. so that ambient air quality standards may clearly be met.

Although various methods for processing flue gas have been devised, for example, washing or scrubbing, chemical absorption, neutralization, and chemical reaction or conversion, all such methods for removal of sulfur oxides require extensive and expensive auxiliary equipment, thus increasing both operating and capital costs. Another approach, set forth in United States Pat. No. 3,699,037, contemplates the addition of at least a stoichiometric amount of a calcium or magnesium compound to the cracking cycle in relation to the amount of sulfur deposition on catalyst. This added material is intended to react with sulfur oxides and then, being in a finely subdivided condition, exit from the cracking cycle as particulate matter in the regenerator flue gas stream. Continued addition of such material obviously increases operating costs.

It is necessary that the method selected for reducing such emissions be effective without lowering the activity and selectivity of the cracking catalyst. Amorphous catalysts, such as silica-alumina and silica-magnesia, have long since been generally supplanted by catalysts of much higher activity which comprise a crystalline aluminosilicate, or "molecular sieve," component present in preferably a silica-alumina matrix.

It is likewise necessary that the method selected not substitute one form of undesirable emission for another, for example, the reduction of sulfur oxide emission coupled with an increase in particulate emission.

In view of these considerations, a highly desirable approach to a reduction in the emission of sulfur oxides from petroleum cracking units lies in a high-activity cracking catalyst, modified to minimize sulfur emissions while maintaining high catalyst activity, coupled with retained stability and resistance to attrition, under conventional cracking conditions in either existing or new cracking units.

SUMMARY OF THE INVENTION

This invention is directed to a cyclic fluidized catalytic cracking process, and a catalyst therefor, suitable for use with sulfur-containing hydrocarbon feedstocks, characterized by a marked diminution in the emission of sulfur oxides in the regenerator stack gases.

High-activity catalyst comprising a crystalline aluminosilicate (or "molecular sieve") component distributed in an active cracking catalyst matrix is employed to effect high conversion. The catalyst is modified by impregnation with one or more metal compounds of Group IIA, especially compounds of magnesium, followed by calcination, to provide from about 0.25 to about 5.0 wt. percentage of Group IIA metal or metals as an oxide on the catalyst. Regeneration of catalyst deactivated by coke deposits is effected by burning coke from the catalyst in the presence of an oxygen-containing gas stream.

The content of sulfur oxides (dioxide and trioxide) in the regenerator flue gas stream is decreased substantially, generally about 50% or less of the level experienced with catalyst not impregnated according to this invention.

DESCRIPTION OF THE INVENTION

Emissions of sulfur oxides are markedly reduced, when regenerating catalyst for use in a cyclic fluid catalytic cracking process, by employing a catalyst comprising one or more metal compounds derived from Group IIA metals, and especially compounds of magnesium, in an amount selected to provide from about 0.25 to about 5.0 wt. percent, preferably from about 0.5 to about 2.0 wt. percent of Group IIA metal or metals, said metal compounds being introduced by impregnation and subsequent calcination on the surface of an otherwise highly active fluid cracking catalyst. This process and catalyst may be employed in any fluid cracking system normally employed with a high-activity fluidized cracking catalyst.

Suitable petroleum fractions include sulfur-containing light gas oils, heavy gas oils, wide-cut gas oils, vacuum gas oils, kerosenes, decanted oils, residual fractions and cycle oils derived from any of these. Such fractions may be employed singly or in any desired combination. The content of organic sulfur compounds may vary widely to afford in the petroleum fraction from about 0.1 to about 3.0 wt. percent or more sulfur.

Suitable catalysts include any high-activity fluidizable cracking catalysts, limited only by their ability to be effectively regenerated under the selected conditions, which comprise combinations of silica and alumina, containing 10–50 wt. percent alumina, in admixture with "molecular sieves" or crystalline aluminosilicates, the latter being present in an amount ranging from about 0.1 to about 10 wt. percentage of the total. Admixtures of clay-extended aluminas may also be employed. Such catalysts may be prepared by any suitable method, such as milling, cogelling, and the like, subject only to provision of the finished catalyst in a physical form capable of fluidization. Suitable "molecular sieves" include both naturally-occurring and synthetic aluminosilicate materials, such as faujasite, chabazite, X-type and Y-type aluminosilicate materials, and ultrastable, large-pore crystalline aluminosilicate materials. The metal ions contained therein are exchanged in large part for rare earth, ammonium or hydrogen ions by known techniques so that the sodium ion content is less than 0.5 wt. percent.

Such catalysts are then impregnated with a compound or mixture of compounds of one or more roGup IIA metals. The preferred metal is magnesium, although calcium, strontium or barrium may likewise be employed. Impregnation may be effected from an aqueous solution or from solution in an organic solvent, in either event employing an appropriate amount of a soluble compound in sufficient solvent to just completely wet the selected catalyst mass, i.e., fill the pore volume of the catalyst mass. The wetted solid mass is then dried and finally calcined at, for example, about 1,000° F. for about 1 to 5 hours, preferably about 3 hours.

Preferred water-soluble compounds include the acetates, nitrates, and the like. Preferred organic compounds include, for example, the acetylacetonates in a solvent such as benzene. In practice, any soluble salt may be employed in solution in an appropriate solvent which may be removed readily in a subsequent drying step.

After calcination, the added Group IIA metal is present mainly as an oxide. Use of such a treated high-activity cracking catalyst has little effect upon either the proportion of petroleum feedstock converted to coke or the sulfur content of the coke normally formed thereby. However, the combustion of coke from spent catalyst is normally accompanied by combustion of sulfur so that the flue gas from the regenator normally contains sulfur oxides, principally sulfur dioxide, as well as both carbon monoxide and carbon dioxide. Use of high-activity cracking catalysts, treated as disclosed herein, permits the maintenance of a given level of cracking activity while greatly diminishing the emission of sulfur oxides in the regenerator stack gases.

Although the disclosed process is not to be limited thereby, it is believed that the sulfur deposits on the spent catalyst are largely converted to Group IIA metal sulfate in the regeneration zone and thus rendered unavailable for exit as gaseous sulfur oxide in the stack gas. The sulfate as formed remains on the re-activated catalyst as it passes to the cracking reaction zone and, in the reducing atmosphere there present, is converted to metal sulfide. Upon stripping, the metal sulfide is hydrolyzed with steam and the sulfur exits in the stripper effluent stream as hydrogen sulfide. The Group IIA metal is thereby converted to the oxide and is again available for reaction with sulfur oxides in the next regeneration cycle. Hydrogen sulfide is recovered with the cracking products from the stripper, separated and converted to elemental sulfur in conventional facilities.

These reactions may be summarized:

Regenerator $MgO + SO_2 + \frac{1}{2} O_2 = MgSO_4$
Reactor $MgSO_4 + 4\ H_2 = MgS + 4\ H_2O = MgO + H_2S + 3\ H_2O$
Stripper $MgS + H_2O = MgO + H_2S$ These reactions are made possible through the impregnated metal oxide incoporated in the cracking catalyst. The high cracking activity normally present in the "molecular sieve" catalyst remains substantially unaffected by the impregnation operation so that the anticipated conversion of feedstock and yield of cracked products are realized together with the diminution of sulfur oxides described above.

Provision of a catalyst, particularly a regenerated catalyst, for use in such a cyclic fluid-bed petroleum conversion process, having a suitably low coke content without having been subjected to conditions which permanently impair catalyst activity, is effected by a rapid separation of fluidized catalyst from petroleum conversion products followed by regeneration of stripped catalyst under suitable combustion conditions.

Conversion of a selected petroleum fraction is effected catalytically, preferably in one or more fluidized transport reactors, at conversion temperature and at a fluidizing velocity which limits the conversion time to not more than about ten seconds. Reactor effluent, comprising petroleum vapors and catalyst containing a deactivating quantity of coke, is then transferred to a separation zone. Petroleum vapors are then separated from spent catalyst. The latter is then mixed with an inert stripping gas, such as steam, flue gas or nitrogen, and stripped petroleum vapors are similarly separated from the catalyst in a cyclone separator. The stripping vessel is suitably maintained at a temperature in the range from 850° to 1050° F. and preferably is operated at about 950° F. Preferred stripping gas is steam, although nitrogen or flue gas may be employed, introduced at a pressure in the range from 10 to 35 p.s.i.g., suitable to effect substantially complete removal of volatile components from the spent catalyst. The stripped, spent catalyst is then transferred from the cyclone separator to a conventional regenerator vessel.

Stripped catalyst, at stripper temperature, is admitted by any conventional means to a regeneration zone, where overall regeneration gas flow is countercurrent to that of the catalyst. Fresh oxygen-containing regeneration gas is fed into the bottom of the catalyst regeneration zone. Regeneration temperature in at least one dense-phase fluidized-bed stage is sufficiently high to achieve substantially complete combustion of the coke deposits. Substantially complete removal of coke from catalyst is essential if activity is to be restored adequately where the catalyst comprises a crystalline aluminosilicate. Regenerated catalyst is then available for recycle to the cracking reactor.

The regeneration stage (or stages) is maintained at a pressure in the range from 10 to 35 p.s.i.g. and a temperature in the range from 1050° to 1350° F., preferably from about 1100° to about 1250° F. The regeneration gas may be air or any oxygen-containing gas mixture suitable for combustion of coke deposited on silica and/or alumina surfaces. The regeneration gas enters the bottom of the regenerator from a blower or compressor. A fluidizing velocity in the range from 1 to 4 feet/second is maintained. Regenerated high-activity catalyst at substantially the temperature of the final regeneration stage is then provided for recycle to the transfer-line reactor. Regenerated silica-alumina catalyst containing a molecular sieve component should have a coke level not more than about 0.1 wt. percent.

With reference to the effective use of this invention in a fluid catalytic cracking process, a wide variation in cracking conditions can be tolerated. In the usual case where a gas oil feed is employed, the throughput ratio (TPR), or volume ratio of total feed to fresh feed, may vary from 1.0 to 2.0. Conversion level may vary from 40% to 100%. Conversion is here defined as the percentage reduction of hydrocarbons boiling above 430° F. at atmospheric pressure by formation of lighter materials or coke. The weight ratio of catalyst to oil in the reactor may vary within the range from 2 to 10 so that the fluidized dispersion will have a density in the range from 1 to 5 pounds/cubic foot. Fuidizing velocity may be in the range from about 20 to about 60 feet/second. This cracking process is preferably effected in a vertical transport reactor wherein the ratio of length to average diameter is at least about 25.

The following embodiments are illustrative, without limitation, of the invention.

EXAMPLE I

Equilibrium DZ-5 (Davison Chemical Division, W.R. Grace & Co.) fluid cracking catalyst (50 grams), calcined and free of coke, was impregnated with a solution, prepared by dissolving 5.2 grams magnesium nitrate, Mg $(NO_3)_2 \cdot 3H_2O$, in 50 ml. distilled water, sufficient to completely wet the cracking catalyst. The wetted catalyst was then drier at 250° F. for 3 hours and thereafter calcined at 1000° F. of 3 hours. The calcined catalyst contained, by calculation, 1.0 wt. percent magnesium, present as the oxide.

Bench-scale batch laboratory fluid cracking tests were conducted with a gas oil feed, containing 2.4 wt. percent sulfur in the form of organic sulfur compounds. In comparative cracking tests at constant cracking severity, with the calcined equilibrium catalyst free of coke and with the impregnated catalyst of this Example, the quantity of sulfur dioxide liberated from the spent catalyst upon subsequent regeneration was measured and calculated as p.p.m. sulfur on catalyst. The sulfur removable by regeneration from DZ–5 catalyst was 134 p.p.m. Sulfur removable from the impregnated DZ–5 catalyst was 52 p.p.m., a reduction of 61%.

EXAMPLE II

The procedure of Example I was employed to provide an impregnated catalyst containing 0.5 wt. percent magnesium, present as the oxide. When employed in the cracking test and subsequently regenerated, the removable sulfur was 73 p.p.m., a reduction of 46%.

EXAMPLE III

Equilibrium TS–280 (American Cyanamid Co.) fluid cracking catalyst (80 pounds), calcined and free of coke, was impregnated in three batches with 4.2 pounds magnesium nitrate dissolved in 12 liters distilled water, sufficient to just fill the pore volume of the catalyst. The wetted catalyst was dried at 250° F. and subsequently calcined at 1000° F. for 3 hours, to provide 0.5 wt. percent magnesium, present as magnesium oxide.

Pilot-plant cyclic fluid cracking tests were conducted with a gas oil feed, having a sulfur content of 2.4 wt. percent, employing equilibrium TS–280 catalyst and the impregnated and calcined catalyst of this Example. Comparative data are presented in Table I. The impregnated catalyst led to reduction of $SO_2$ emissions from 520 to 220 p.p.m. in the regenerator flue gas, a reduction of 57.5%. Conversion and product yields were essentially identical with each catalyst.

TABLE I

| | Test | |
|---|---|---|
| | A | B |
| Catalyst | TS-280 plus 0.5% Mg | TS-280 |
| Cracking conditions: | | |
| Feed rate, lbs./hr | 23.4 | 23.8 |
| TRP | 1.0 | 1.0 |
| Cat. circulation, lbs./hr | 259 | 268 |
| Reactor temp., °F | 971 | 968 |
| Regen. cat., °F | 1,148 | 1,140 |
| WHSV | 33.41 | 33.28 |
| Severity | 2.52 | 2.62 |
| Cat. residence, min | 0.16 | 0.16 |
| Reactor pressure, p.s.i.g | 20.0 | 20.0 |
| Stripping conditions: | | |
| Temp., °F | 969 | 966 |
| Steam, lbs./ton cat | 19.3 | 18.6 |
| Cat. residence, min | 0.62 | 0.64 |
| Regeneration conditions: | | |
| Temp., °F | 1,089 | 1,086 |
| Carbon on spent cat., wt. percent | 0.44 | 0.43 |
| Carbon on regen. cat., wt. percent | 0.03 | 0.04 |
| Flue gas comp., mol. percent: | | |
| $CO_2$ | 4.5 | 3.9 |
| CO | 2.2 | 2.6 |
| $O_2$ | 5.1 | 5.1 |
| Sulfur on spent cat., wt. percent* | 2.08 | 2.03 |
| Flue gas $SO_2$, p.p.m.** | 220 | 520 |
| Products: Conversion, vol. percent | 71.6 | 72.4 |
| Yield: | | |
| $C_2$ and lighter, wt. percent | 3.76 | 2.89 |
| $C_3$, vol. percent | 10.67 | 10.19 |
| $C_4$, vol. percent | 14.61 | 14.90 |
| $C_5$–435° F., vol. percent | 51.11 | 54.77 |
| Recovery, vol. percent | 105.38 | 107.11 |

*Organic S carried into regenerator.
**Net S emitted to atmosphere.

We claim:
1. A cyclic fluidized catalytic cracking process, characterized by reduced emissions of sulfur oxides on regenerator stack gases, wherein a hydrocarbon feedstock containing organic sulfur compounds is subjected to cracking under fluidizing conditions with a high-activity fluid cracking catalyst in a reaction zone, cracking catalyst deactivated by coke deposits is separated from cracked hydrocarbon reaction zone effluent and regenerated to high activity in a catalyst regeneration zone by burning the coke deposits from the fluid catalyst in contact with an oxygen-containing gas stream, and regenerated fluid catalyst is recycled to the reaction zone, said process comprising the cracking of the hydrocarbon feedstock containing organic sulfur compounds in the presence of a regenerable fluid cracking catalyst, having a crystalline aluminosilicate component, said catalyst having been additionally impregnated with a Group IIA metal compound or a mixture of Group IIA metal compounds and subsequently calcined to provide from about 0.25 to about 5.0 wt. percent of the Group IIA metal or mixture of Group IIA metals, present as an oxide or oxides.

2. The process of Claim 1 wherein the cracking catalyst is impregnated to provide from about 0.5 to about 2.0 wt. percent of the Group IIA metal or mixture of Group IIA metals.

3. The process of Claim 1 wherein the Group IIA metal is magnesium.

4. The process of Claim 1 wherein the mixture of Group IIA metals comprises at least about 50 mole percent magnesium.

5. The process of Claim 1 wherein the catalyst regeneration is effected at a temperature within the range from 1050° to 1350° F.

6. A fluidizable solid cracking catalyst composition for use in the cracking of hydrocarbon feedstocks containing organic sulfur compounds under fluidizing conditions, comprising a silica-alumina cracking catalyst matrix, said matrix containing from about 10 to about 50 wt. percent alumina, from about 0.1 to about 10.0 wt. percent of a crystalline aluminosilicate uniformly distributed throughout said matrix, and from about 0.25 to about 5.0 wt. percent of a Group IIA metal or mixture of Group IIA metals, present as an oxide or oxides, said Group IIA metal or metals having been distributed over the surface of said matrix.

7. The catalyst composition of Claim 6 wherein the Group IIA metal or metals are distributed over the matrix surface by impregnation with a compound of a Group IIA metal or a mixture of compounds of Group IIA metals and subsequent calcination.

8. The catalyst composition of Claim 7 wherein the mixture provides by impregnation from about 0.5 to about 2.0 wt. percent of the Group IIA metal or mixture of Group IIA metals.

9. The catalyst composition of Claim 7 wherein the Group IIA metal is magnesium.

10. The catalyst composition of Claim 7 wherein the mixture of Group IIA metals provided by impregnation comprises at least 50 mole percent magnesium.

References Cited

UNITED STATES PATENTS

| 2,436,927 | 3/1948 | Kassel | 252—417 |
| 3,475,121 | 10/1969 | Thornton | 423—540 |
| 3,699,037 | 10/1972 | Annesser et al. | 208—120 |

DELBERT E. GANTZ, Primary Examiner

G. E. SCHMITKONS, Assistant Examiner

U.S. Cl. X.R.

208—113, 226; 252—417, 440; 423—244, 539